(12) United States Patent
Hewitt

(10) Patent No.: US 8,151,465 B2
(45) Date of Patent: Apr. 10, 2012

(54) METHOD OF MOUNTING AND POSITIONING A BEARING ASSEMBLY ONTO A SHAFT USING A HYDRAULICALLY ACTUATED TOOL THAT APPLIES A PRELOAD TO THE SHAFT

(75) Inventor: William G. Hewitt, Taylors, SC (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 12/961,802

(22) Filed: Dec. 7, 2010

(65) Prior Publication Data

US 2011/0072632 A1    Mar. 31, 2011

Related U.S. Application Data

(62) Division of application No. 11/526,341, filed on Sep. 25, 2006, now Pat. No. 7,866,894.

(51) Int. Cl.
*F16B 37/08* (2006.01)

(52) U.S. Cl. ............... 29/898.07; 29/898.08; 29/898.09; 29/407.05; 29/407.1; 29/252; 384/538; 384/556; 411/434; 411/14; 403/349; 403/348

(58) Field of Classification Search ............... 29/898.07, 29/898.08, 898.09, 407.01, 407.05, 407.1, 29/252; 384/510, 584, 556, 537, 538
See application file for complete search history.

(56) References Cited

U.S. PATENT DOCUMENTS

| | | | | |
|---|---|---|---|---|
| 2,764,437 A * | 9/1956 | Bratt | ............................. | 403/15 |
| 3,033,597 A * | 5/1962 | Miller | ............................. | 403/15 |
| 3,108,839 A * | 10/1963 | Johnson | ........................ | 384/510 |
| 3,304,139 A * | 2/1967 | Toth et al. | ...................... | 384/556 |
| 3,861,344 A | 1/1975 | Bergling | | |
| 3,957,319 A * | 5/1976 | Gorski | ............................. | 384/556 |
| 4,525,916 A * | 7/1985 | Wuhrer | ............................. | 29/446 |
| 4,938,615 A * | 7/1990 | Baker | ............................. | 384/571 |
| 4,973,173 A * | 11/1990 | Bergling | ........................ | 384/619 |
| 5,029,461 A * | 7/1991 | Lawrence et al. | ............... | 72/238 |
| 5,489,156 A | 2/1996 | Martinie | | |
| 5,685,068 A * | 11/1997 | Bankestrom et al. | ...... | 29/898.07 |
| 5,685,650 A * | 11/1997 | Martinie et al. | .............. | 384/538 |
| 5,709,483 A * | 1/1998 | Martinie | ........................ | 384/538 |
| 5,779,419 A * | 7/1998 | Kellstrom et al. | ............ | 411/434 |
| 5,800,088 A * | 9/1998 | Luckhof et al. | ............... | 403/349 |
| 5,857,783 A * | 1/1999 | Johansson et al. | ............ | 384/556 |
| 5,897,214 A * | 4/1999 | Nisley | ........................... | 384/537 |
| 6,939,053 B2 * | 9/2005 | Nisley et al. | ................... | 384/538 |

OTHER PUBLICATIONS

Rockwell Automation; Dodge Dimensions; Imperial—IP Pillow Block; 33 pages.
Rockwell Automation; Dodge; Features/Benefits; Imperial; Patented Adapter System Offers Quick Installation and Removal, 3 pages.
Rockwell Automation; Dodge; Dodge Spherical Bearings; Imperial Bearings; website: http://www.dodge-pt.com/products/bearing/spherical/imperial_bearing.html; 2 pages.

* cited by examiner

*Primary Examiner* — David Bryant
*Assistant Examiner* — Jason L Vaughan
(74) *Attorney, Agent, or Firm* — Thompson Coburn LLP

(57) ABSTRACT

A mounting system is disclosed for mounting a bearing assembly or other mechanical element to a shaft. The mounting system uses a tapered sleeve mechanism to secure the bearing assembly on the shaft. Specifically, a pressure loaded piston drives the sleeve from a pre-assembled position to an initial position. The initial position is determined by monitoring the pressure applied to the piston. Once the initial position has been reached, a linear indicator is used to measure the axial sleeve movement from the initial position to a final position. The system remains in place after the bearing is installed on the shaft and facilitates removal of the bearing assembly from the shaft.

8 Claims, 4 Drawing Sheets

METHOD OF MOUNTING AND POSITIONING A BEARING ASSEMBLY ONTO A SHAFT USING A HYDRAULICALLY ACTUATED TOOL THAT APPLIES A PRELOAD TO THE SHAFT

RELATED APPLICATION DATA

This application is a division of application Ser. No. 11/526,341, filed Sep. 25, 2006, currently pending, the disclosure of which is incorporated by reference herein.

BACKGROUND

The present invention relates to the field of rotating machinery and to systems for mechanically mounting an element to a shaft. More specifically, the invention relates to an innovative hydraulically positioned shaft bearing attachment system used to mount a bearing assembly to a shaft.

Rotary mechanical systems include elements, such as bearings, that allow relative rotational movement between respective parts. For example, a rotary system might include a stationary housing that supports a rotating shaft via a bearing assembly. The bearing assembly is typically mounted directly to the shaft and allows for the relative rotational movement between the stationary housing and the rotating shaft.

A variety of mounting systems are known and commercially available for mounting a bearing assembly or other mechanical element to a shaft. Some of these systems make use of a tapered sleeve that fits snuggly between the outer periphery of the shaft and the inner ring of the bearing assembly. The tapered outside diameter of the sleeve engages the tapered inside diameter of the bearing assembly and causes the sleeve to enter into an interference fit with both the inner ring and the shaft. Variations of this type of arrangement may include multiple sleeves that alleviate the need for a taper either on the shaft or the bearing ring, as well as various mechanical arrangements for pressing or drawing the sleeve into tight engagement.

Those skilled in the art are familiar with the operation of this type of system and the limitations of using such systems. A first limitation relates to part tolerance and the initial clearance between these parts (i.e., the shaft outside diameter, the sleeve width, the inside diameter of the bearing assembly, etc.). These are inherent in every mechanical system because each component is manufactured within some tolerance range and each assembly has some initial clearances to allow the user to assemble and initially position the parts. In bearing mounting arrangements, the user can eliminate this variable by assembling the parts to an initial position or "zero reference point" that represents the position where all of these tolerances and initial clearances between the parts have been removed. This initial position can be problematical in that, if not accurately established, it can lead to further assembly problems as discussed below. No current bearing mounting system provides an easy, reliable, and consistent method to determine this initial position.

Besides the tolerance and initial clearance between all of the mating parts, bearing assemblies themselves have an initial internal clearance between the internal components of the bearing. Too much, and particularly too little internal clearance, such as resulting from overloading the internal ring, can result in damage to the bearing and eventual mechanical system failure. Tapered sleeve arrangements can overload bearings, effectively reducing the internal clearance by expanding the inner ring of the bearing. In current bearing mounting systems, it may be difficult to determine exactly how much inner ring expansion might occur during the assembly process.

Another limitation of tapered sleeve mounting systems relates to the manner in which the tapered sleeve is driven or drawn into engagement between the bearing assembly and the shaft. Often in such systems, a drive thread is used to urge the tapered sleeve into place. This drive thread is often incorporated into the outside diameter of the sleeve itself, thus requiring the thread to be no less than the shaft diameter. Because these systems can be used on very large shaft diameters (e.g., 10 inches and larger), the threads themselves must also be relatively large. Consequently, special tooling is often required to torque the larger components that engage the oversized threads. Furthermore, this tooling does not solve the problem of accurately determining the initial position.

A further issue with existing bearing mounting systems is that large diameter threads have larger contacting areas and thus frictional losses are increased. This is, of course, particularly problematic for large shaft and bearing sizes. These forces, when combined with the frictional forces of the tapered system itself, result in very large moments that must be imparted on the components to thread the sleeve properly into engagement. Also, those skilled in the art will appreciate that the frictional force in this thread can vary greatly resulting in a great deal of uncertainty in the torque required to engage the sleeve in place. This is problematic because this torque value is often used to determine the initial position and/or the fully engaged position. If this torque is not consistent, the proper positioning of the sleeve will be uncertain.

Another limitation of tapered sleeve mounting systems relates to the force required to extract the sleeve from between the bearing assembly and the shaft. As discussed above, the tapered sleeve is driven into the bearing assembly using a drive mechanism that may expand the inner race of the bearing, thus creating contact stress between the parts. In large diameter bearing systems (e.g., 10 inches and larger), this contact stress can be very high, requiring a great deal of force to disengage the sleeve from the bearing assembly. Some mounting systems require the user to overcome this force manually, making it extremely difficult for the user to disengage the bearing from the shaft.

There is a need in the art for techniques for securing rotating components, particularly bearings and shafts, that alleviate or address at least some of these drawbacks of existing technology. There is a particular need for an approach in the assembly of sleeve systems that allows for accurate judgment of initial and final engagement of a sleeve between a bearing and a shaft, or between any two concentrically mating elements. Furthermore, there is a need for a system that is less physically tasking on the user in order to complete the installation.

BRIEF DESCRIPTION

The present invention offers a novel approach that addresses some or all of the issues and problems discussed above. In one implementation, the invention may generally include an internal flange, an external flange, a tapered sleeve, a piston, and a plurality of fasteners. The system mounts a bearing assembly to a shaft by driving the tapered sleeve into the assembly via an innovative hydraulic positioning system. The system is incorporated into the parts and eliminates the need for custom fixturing or special tooling. Unlike other mounting systems that make use of a single large diameter drive thread, the present invention uses a hydraulically loaded piston to engage the sleeve between the bearing assembly and the shaft. This loading system effectively reduces the frictional loses in the drive mechanism and does not require the user to overcome an excessive amount of drive thread resistance. This also has the very important benefit of allowing the user to accurately determine and reliable quantify an initial position of the sleeve as it is driven into engagement by monitoring the pressure applied to the piston.

Once the initial position is determined, a linear indicator may be used to measure the movement of the sleeve and/or the bearing assembly relative to the initial position. The user can accurately determine the final position given a known predetermined distance between the initial position and the final position. Furthermore, the user may secure the sleeve in place by threading a screw into the external flange thereby abutting the piston to maintain a constant load on the sleeve. Finally, the system is configured to remain in place after the bearing is mounted to the shaft making it readily available should the bearing require maintenance.

The system further includes a removal chamber that facilitates extraction of the sleeve from between the bearing and shaft using a pressure loaded hydraulic fluid. The removal chamber is formed between the interface of the bearing assembly and a tapered outside diameter of the sleeve. As mentioned above, because the attachment system remains in place, very little additionally tooling is required to service the bearing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
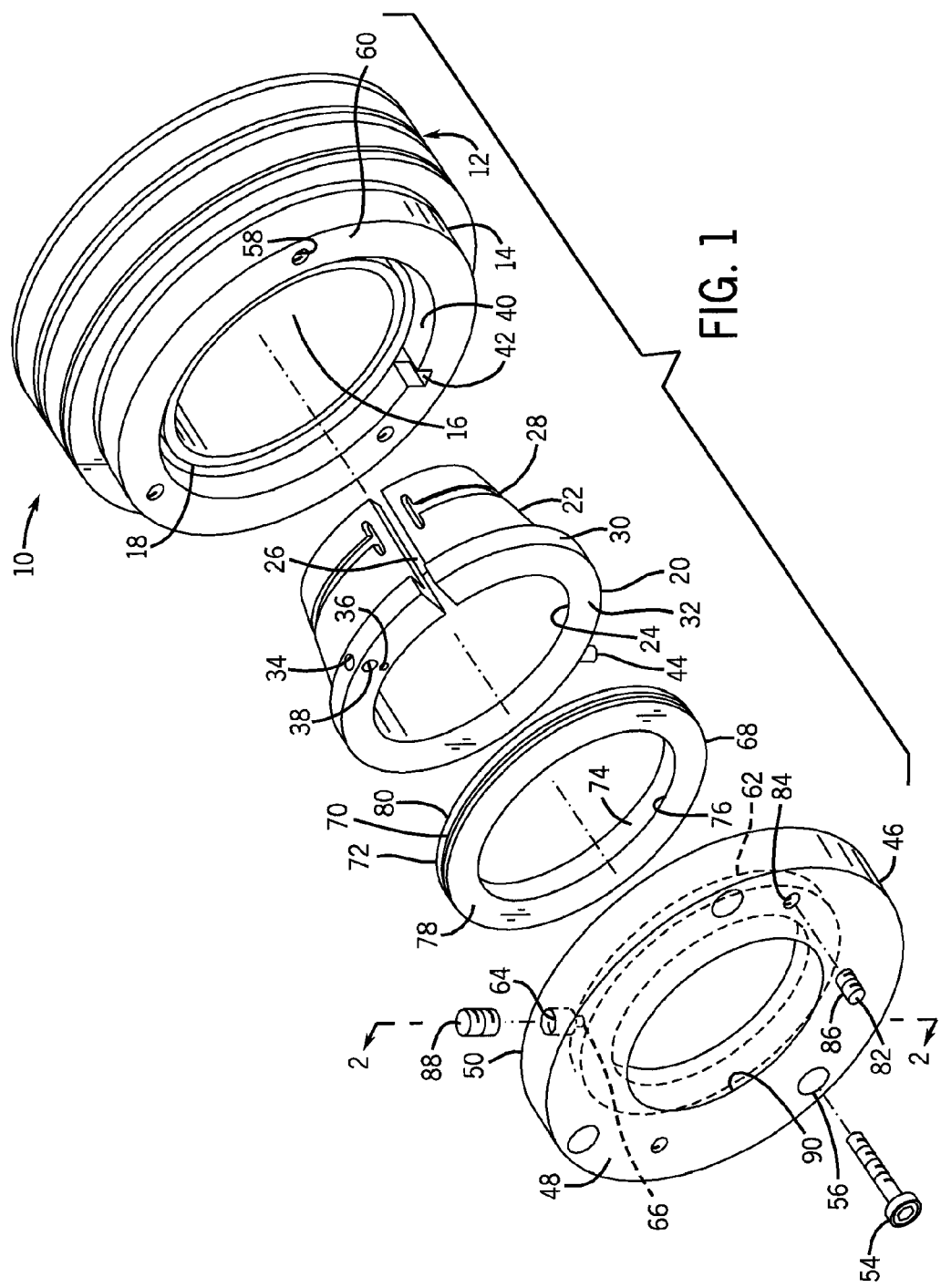
FIG. 1 is an exploded perspective view of the attachment system, illustrating a bearing assembly, an external flange, an internal flange, a tapered sleeve, a piston and fasteners in a presently contemplated embodiment of the invention.

Turning now to the drawings, FIG. 1 illustrates the elements of the hydraulically positioned bearing attachment system in accordance with an exemplary embodiment of the invention. The system includes a bearing kit 10 comprising of a bearing assembly 12 and an internal flange 14. The bearing assembly 12 has a tapered inside diameter 16 and a guide diameter 18 to radially locate and mate with an internal diameter of the internal flange 14. A sleeve 20 having a tapered outside diameter 22 engages the tapered inside diameter 16 of the bearing assembly 12. The sleeve 20 has a uniform inside diameter 24 and an axial split 26 allowing it to clamp down on a circular shaft when the outside diameter 22 is engaged. It should be noted that the present system may be employed with components that are differently configured, particularly insomuch as the engaging tapers are concerned. For example, to avoid tapering the inside of the bearing assembly itself, another sleeve may be interposed in the assembly that has a surface interfacing with the inner diameter of the bearing assembly, and a tapered inner surface that contacts the tapered outside diameter 22 of sleeve 20.

The sleeve 20 has a series of recesses 28 located on its outside diameter 22. The recesses 28 form part of a removal chamber contained by the tapered outside diameter 22 of the sleeve 20 interfacing the tapered inside diameter 16 of the bearing assembly 12. The removal chamber will be discussed in more detail below with reference to FIG. 4. The outer portion of the sleeve 20 transitions from the tapered outside diameter 22 to a uniform outside diameter 30 near the front face 32 of the sleeve 20. The sleeve 20 has a vertically drilled and plugged hole 34 located on the uniform diameter 30 and a horizontally drilled and plugged hole 36 located on the front face 32. These holes form part of the removal chamber and allow for hydraulic coupling to the removal chamber via the hydraulic access port 38 located on the front face 32 of the sleeve 20. Again, the operation of the removal chamber will be discussed in more detail below with reference to FIG. 4.

The internal flange 14 has a stepped inside diameter 40, further having a recess 42 extending from the front face for a portion of the stepped diameter. A key or pin 44 extends from the uniform diameter 30 of the sleeve 20 and engages the recess 42. This prevents any relative motion between these parts that could otherwise generate frictional heat and lead to eventual failure or unscheduled maintenance of the system.

The system further includes an external flange or housing 46 having a front face 48 and back face 50. The external flange 46 is secured to the internal flange 14 via a plurality of fasteners 54. Countersunk holes 56 are located on the front face 48 of the external flange 46 allowing the fasteners 54 to pass through and engage the threaded holes 58 located on the front face 60 of the internal flange 14. A ring-like recess is located on the back face 50 of the external flange 46 forming an internal hydraulic chamber 62. An access port 64 is hydraulically coupled to the internal chamber 62 via a vertically cross-drilled hole 66. The access port 64 allows a user to externally couple a hydraulic pump (e.g., a hand pump, not shown) to the system. A piston 68 comprising a ring-shaped body is configured to interface the internal chamber 62 located in the external flange 46. The piston 68 has a seal 70 located on the outside diameter 72 and a further seal 74 located on the inside diameter 76, thereby sealing the internal hydraulic chamber 62 when the piston 68 is seated in the external flange 46.

In operation, applying a pressure to the hydraulic chamber loads the front face 78 of the piston 68, thereby urging the piston 68 to abut the front face 32 of the sleeve 20 and drive the sleeve into the bearing assembly 12. The pressure actuating mechanism will be discussed in more detail below with reference to FIG. 2 and FIG. 3. However, it should be noted that the piston 68 and internal hydraulic chamber 62 are not limited to a ring shape or even to one piston in general. A number of pistons could be implemented and disposed around the diameter and accomplish the same functionality.

A screw 82 engages threaded holes 84 located in the external flange 46. The threaded holes 84 communicate with internal hydraulic chamber 62 allowing the screw 82 to load the front face 78 of the piston to secure it in place. A deformable sealing tape or other thread seal may be placed on the threads 86 of the screw 82 to maintain the internal pressure when the piston 68 is actuated. A plug 88 is threaded into the access port 66, sealing the hydraulic chamber 62 after the bearing assembly is installed on the shaft. Furthermore, the external flange 46 and the piston 68 are configured to remain in place after the bearing assembly is mounted to the shaft. The assembly, in accordance with the illustrated embodiment, then, constitutes a "leave-in-place" pressure actuated tool that greatly facilitates assembly and disassembly of the bearing, shaft and sleeve, without resort to complex additional tooling.

Figure 2:
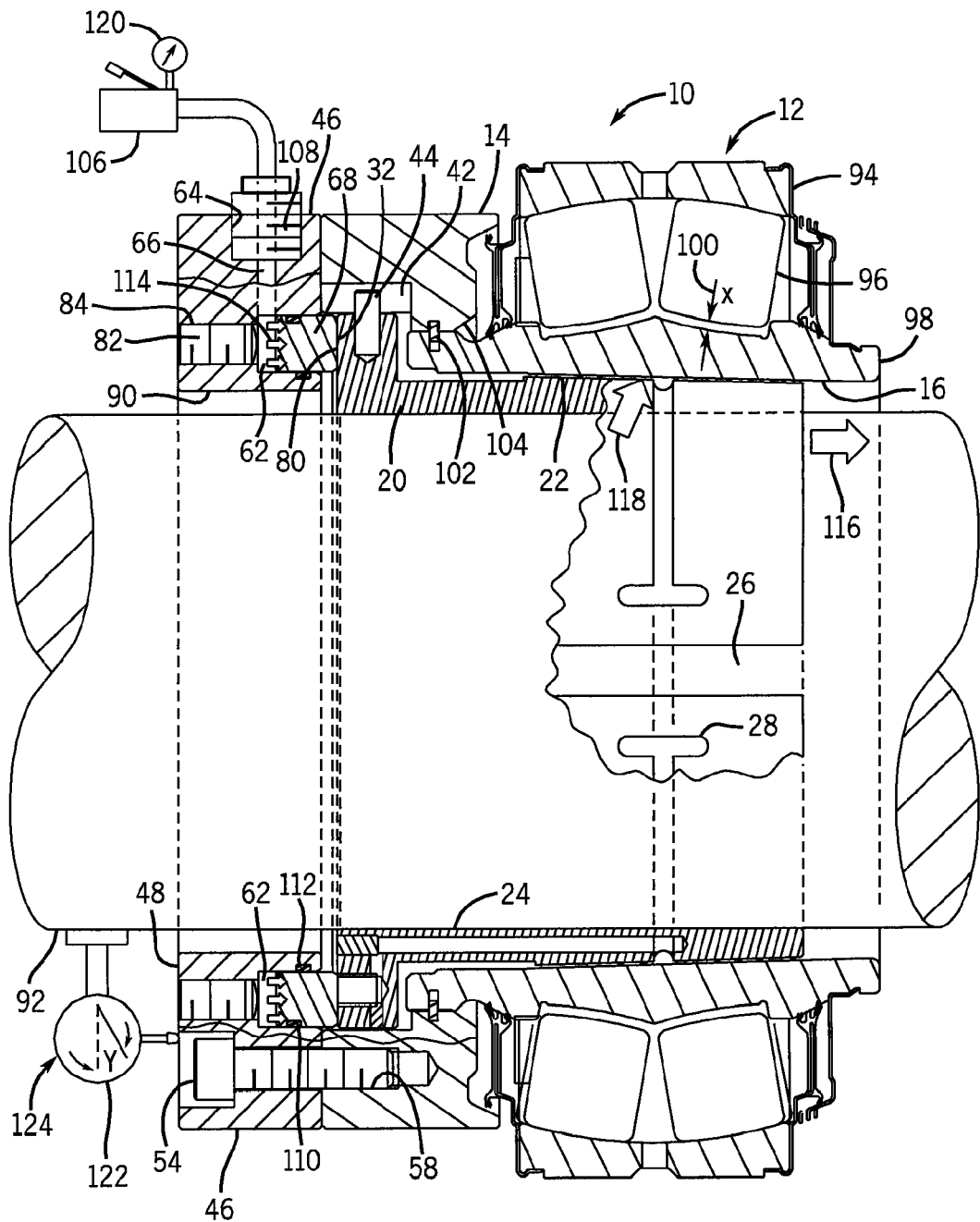
FIG. 2 is a sectional view of the attachment system of FIG. 1 sectioned along line 2-2, illustrating the process for installing the bearing assembly onto the shaft using the innovative drive system.

FIG. 2 is a sectional view of the mounting system of FIG. 1, sectioned along line 2-2. The figure illustrates the procedure for mounting a bearing kit 10 on a shaft 92. A tapered bore spherical roller bearing is illustrated in the figure, although the present invention is not limited to these specific types of bearings or even to bearings products in general. In general, the bearing assembly includes an outer ring 94, a roller set 96, and an inner ring 98. The bearing assembly has an internal clearance 100 as indicated by the letter "x" in the figure. The internal clearance allows the user to initially position the assembly onto the shaft and may be decreased when the bearing is placed in service. This may be done by expanding the inner ring 98 of the bearing assembly by means of the tapered sleeve 20. The internal flange 14 is also part of the bearing kit 10 and is, in the illustrated embodiment, axially secured to the inner ring via a snap ring 102, although other securement means may be employed. The snap ring is compressed by an annular camming surface 104, allowing the internal flange to slide onto the inner ring 98 up to the point where the ring springs into the snap ring groove.

The tapered sleeve 20 is then pressed into engagement between the inner ring 98 and the shaft 92 via a pressure loaded piston 68. This is accomplished by hydraulically coupling an external pump 106 to the internal hydraulic chamber 62 via the access port 64 and a hydraulic fitting 108. As discussed above, deformable tape is used on the screws 82 to from a seal with the threaded holes 84 located in the external flange 46. The hydraulic seal is completed by an o-ring 110 located on the outside diameter of the piston 68 and an inner o-ring 112 sealing on the inner surface of the piston 68. It should be noted that any suitable sealing arrangement could be implemented without affecting the functionality of the system. The pump 106 is used to apply a pressure, as indicated by reference numeral 114, to the internal hydraulic chamber, thereby loading the piston 68. This advances the piston and brings the back face 80 of the piston 68 into contact with the front face 32 of the sleeve 20, resulting in axial movement of the sleeve, as indicated by reference numeral 116. This drives the tapered diameters together and results in an expansion/compression force, represented by reference numeral 118, between the parts. Thus, the pressure loaded piston is used to drive the sleeve to the initial or first position. As discussed above, determining the initial position is useful because it represents the point where all of the tolerances and initial clearance between mating parts has been removed. Once this initial position has been determined, the sleeve and/or bearing assembly is advanced a predetermined distance to properly reduce the internal clearance 100 of the bearing or otherwise fully engage the sleeve between the bearing and the shaft.

The initial position may be determined by monitoring the pressure inside the internal hydraulic chamber 62 via a pressure sensor 120 hydraulically coupled to the chamber. A pressure value that corresponds to the initial position can be pre-determined for the bearing assembly and shaft mounting configuration. This will typically be done empirically for particular sized of product. Once the desired pressure is obtained, the user then drives the sleeve and/or bearing assembly from the initial position to the final position. The distance between the initial position and final position corresponds to an axial sleeve and/or bearing assembly movement required to properly mount the bearing assembly to the shaft, and will also typically be specified for the particular product. Advancement through this pre-determined distance, as indicated by the letter "y" and reference numeral 122 in the figure, may be determined by placing a linear indicator 124 on the shaft to indicate the relative movement of the sleeve and/or bearing assembly from the initial position to the final position. Various types of indicators and indication techniques may be employed, and the invention is not intended to be limited to any particular linear indicator. The user then applies a pressure to the system until the desired axial sleeve and/or bearing assembly movement is observed.

Those skilled in the art will appreciate that this piston loaded drive system reduces frictional losses in the drive mechanism and allows the user to accurately determine and reliable quantify the initial position by monitoring the pressure in the hydraulic chamber, and the final position by measuring the sleeve and/or bearing assembly axial movement relative to the initial position. In other words, the invention eliminates the need to rely on a variable torque measurement to determine the initial or final position. Furthermore, the invention does not require the user to overcome an excessive amount of frictional resistance, thereby making the system easier to install.

Figure 3:
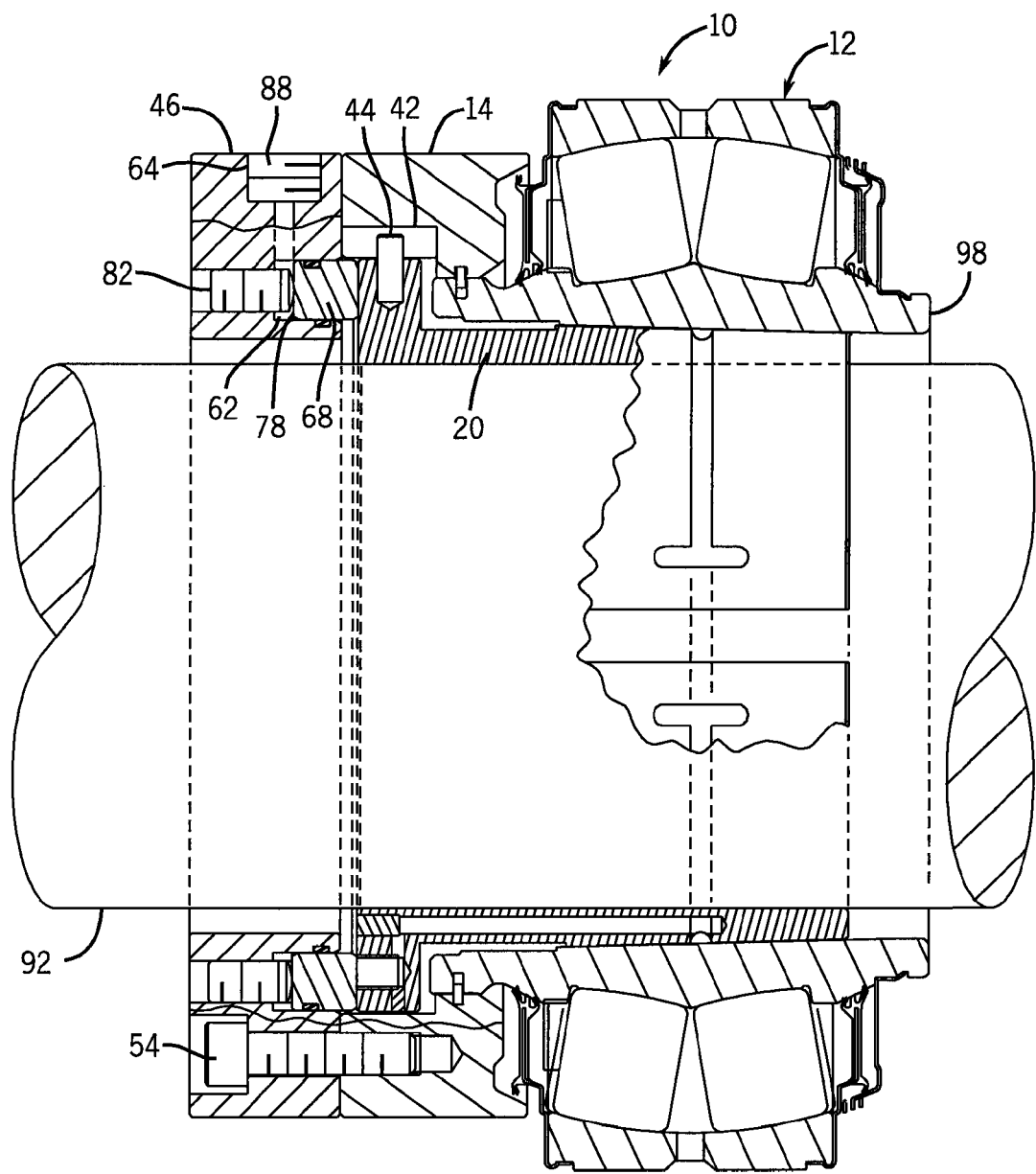
FIG. 3 is a sectional view of the attachment system of FIG. 1 sectioned along line 2-2, further illustrating the process for securing the bearing assembly onto the shaft.

FIG. 3 is the same sectional view illustrated in FIG. 2, but further illustrating the process for securing the piston 68 in place to prevent the sleeve 20 from disengaging the bearing assembly 12 and the shaft 92. Once the final position is reached, the pressure of the hydraulic fluid located in the internal chamber 62 may be relieved, and where desired, the fluid may be drained via the access port 64. The chamber 62 may then be sealed. This is done by uncoupling the hydraulic pump and threading a plug 88 into the access port 64. The piston 68 may then be secured against the sleeve by applying a torque to the screws 82, allowing them to abut the front face 78 of the piston 68. Because the external flange 46 and piston 68 remain in place, the screws 82 and piston 68 prevent the sleeve from disengaging the bearing assembly 12 and the shaft 92. Also, as discussed above, a pin 44 engages a recess 42 thereby preventing relative rotational movement between the internal flange 14, the external flange 46, the sleeve 20, and the inner ring 98.

Figure 4:
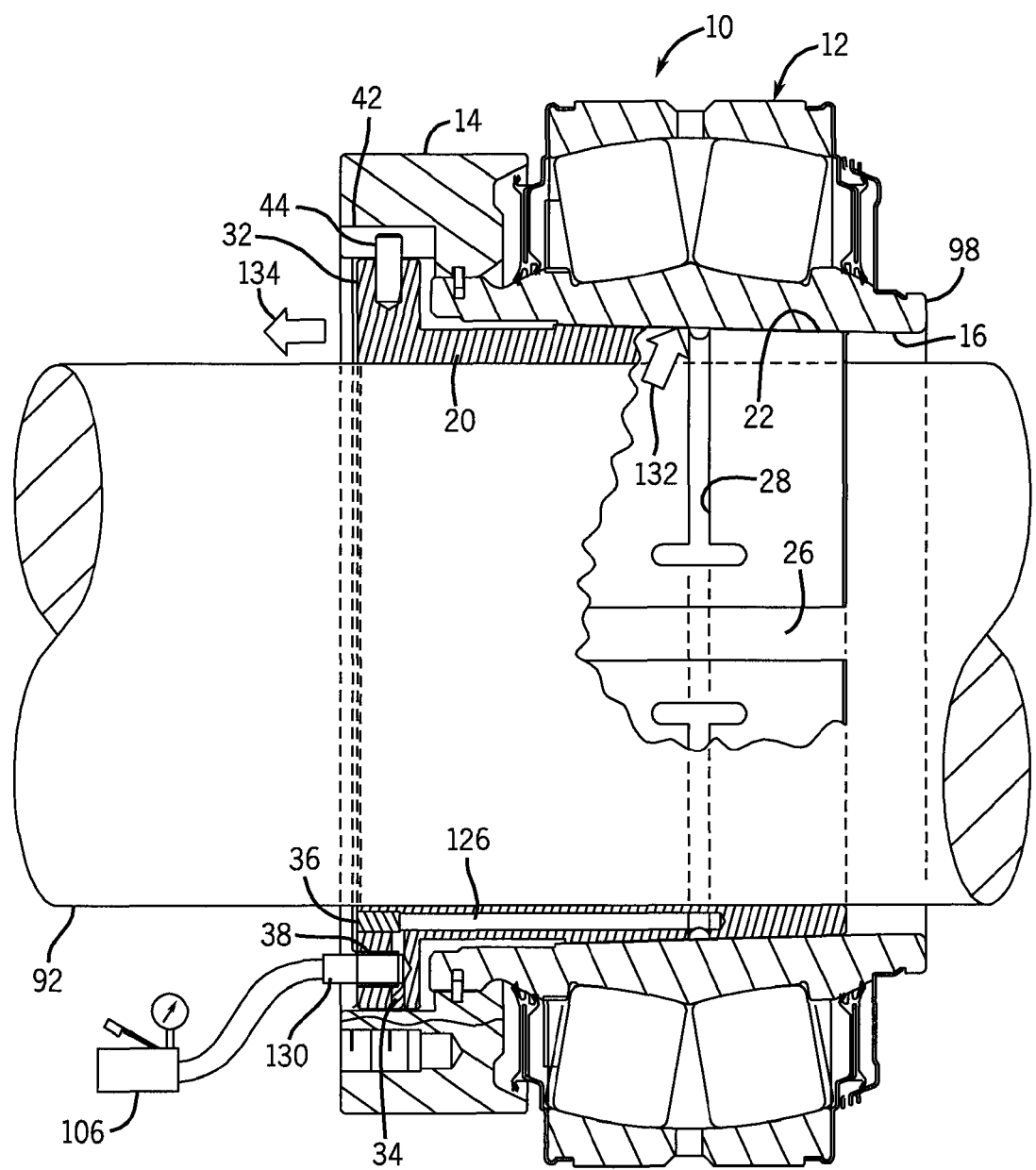
FIG. 4 is a sectional view of the attachment system of FIG. 1 sectioned along line 3-3, illustrating the process for dismounting the bearing assembly from the shaft via the removal chamber.

FIG. 4 is the same sectional view illustrated in FIG. 2, but further illustrating the process for extracting the sleeve 20 from between the bearing assembly 10 and the shaft 92 via the removal chamber 126. The removal chamber is formed by the interface of the outside diameter 22 of the sleeve 20 and the internal diameter 16 of the bearing assembly 12, and further by the recesses 28 located on the outside diameter of the sleeve 20. This interface provides for a hydraulically sealed circuit. The external flange is shown removed from the bearing kit 10 exposing the removal access port 38 located on the front face 32 of the sleeve 20. A hydraulic pump 106 is coupled to the removal chamber 126 via and a hydraulic fitting 130. The horizontal drilled hole 36 and the vertical drilled hole 34 allow a hydraulic fluid from the pump to communicate with the removal chamber. A pressure is thus applied to the removal chamber 126, creating a radial expansion force, indicated by reference numeral 132, forcing the inner ring 98 to expand and thereby driving sleeve 20 out of the inner race 98, as indicated by reference numeral 134. This allows the user to quickly and efficiently dismount the parts from one another.

Finally, as mentioned throughout the present discussion, the present mounting system is not limited to bearing assemblies and may be used to mount other mechanical elements to a shaft. For example, the system may serve to mount mechanical couplings used to couple one shaft to another. To complete this coupling a mechanical element (typically a coupling "half") is directly mounted to the shaft. The present system may be used to mount this type of element, and many others, directly to a shaft offering all of the same benefits and advantages described above.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for mounting a bearing assembly on a shaft wherein the bearing assembly comprises an inner ring and an outer ring concentrically disposed about the inner ring with rotational elements disposed between the inner ring and the outer ring, the method comprising:

providing a pressure actuated tool, wherein the pressure actuated tool includes a piston disposed in a piston housing with the piston housing surrounding the shaft and an internal flange portion extending from the piston housing and providing a mount for mounting the pressure actuated tool to the bearing assembly;

securing the internal flange portion of the piston housing to solely the inner ring of the bearing assembly;

engaging a tapered sleeve to a first position between the bearing assembly and the shaft via the piston of the pressure actuated tool;

further engaging the sleeve from the first position to a final position between the bearing assembly and the shaft via the piston of the pressure actuated tool while measuring relative axial movement of the sleeve and\or the bearing assembly from the first position to the final position via a linear indicator;

securing the sleeve in place at the final position via a screw that engages threads in the piston housing to abut the piston against the sleeve; and wherein the step of securing the internal flange portion of the piston housing to the inner ring includes mounting the internal flange portion in a manner such that the pressure actuated tool remains in place secured to the bearing assembly during rotation of the shaft after the bearing assembly is installed on the shaft;

wherein the step of securing the internal flange portion of the piston housing to the inner ring further includes mounting the internal flange portion in a manner such that the pressure actuated tool rotates with the inner ring of the bearing assembly during rotation of the shaft after the bearing assembly is installed on the shaft; and wherein the step of securing the internal flange portion of the piston housing to the inner ring further includes mounting the internal flange portion in a manner such that piston of the pressure actuated tool is secured against the sleeve during rotation of the shaft after the bearing assembly is installed on the shaft.

2. The method of claim 1, wherein the first position corresponds to a predetermined pressure applied to the pressure actuated tool.

3. The method of claim 1, comprising removing the bearing assembly from the shaft via a removal chamber created between the bearing assembly and the sleeve, the removal chamber configured to allow a pressure loaded hydraulic fluid to extract the sleeve from between the bearing assembly and the shaft.

4. The method of claim 1, wherein the step of securing the internal flange portion of the piston housing to solely the inner ring of the bearing assembly comprises engaging a snap ring between the internal flange portion and the inner ring of the bearing assembly.

5. The method of claim 1, wherein the step of securing the internal flange portion of the piston housing to solely the inner ring of the bearing assembly comprises engaging a pin located on the sleeve with a recess in the internal flange portion.

6. The method claim 1, wherein the step of engaging a tapered sleeve to a first position between the bearing assembly and the shaft further comprises coupling a hydraulic pump to a hydraulic access port of the piston housing for applying pressurized hydraulic fluid against the piston in the piston housing.

7. The method of claim 1, wherein the step of engaging a tapered sleeve to a first position between the bearing assembly and the shaft further comprises providing a pressure sensor configured to indicate the pressure applied to the piston in the housing.

8. The method of claim 7, wherein the first position corresponds to a pre-determined pressure of the fluid applied against the piston in the housing.

* * * * *